United States Patent
Shubin et al.

(10) Patent No.: US 11,425,114 B2
(45) Date of Patent: Aug. 23, 2022

(54) SYSTEMS AND METHODS FOR SUPPORTING A SECURE CONNECTIVITY

(71) Applicant: RingCentral, Inc., Belmont, CA (US)

(72) Inventors: James Shubin, San Francisco, CA (US); Alexey Udalov, San Francisco, CA (US); Sergei Istomin, Palo Alto, CA (US); Benjamin Leznik, Los Gatos, CA (US); Sergey Ustinov, South San Francisco, CA (US)

(73) Assignee: RingCentral, Inc., Belmont, CA (US)

( * ) Notice: Subject to any disclaimer, the term of this patent is extended or adjusted under 35 U.S.C. 154(b) by 389 days.

(21) Appl. No.: 16/589,002

(22) Filed: Sep. 30, 2019

(65) Prior Publication Data

US 2021/0099440 A1 Apr. 1, 2021

(51) Int. Cl.
*H04L 9/40* (2022.01)
(52) U.S. Cl.
CPC ................ *H04L 63/0823* (2013.01)
(58) Field of Classification Search
CPC .................................. H04L 63/0823
See application file for complete search history.

(56) References Cited

U.S. PATENT DOCUMENTS

| 2018/0205720 A1* | 7/2018 | Westerlund ......... H04L 65/1069 |
| 2019/0158353 A1* | 5/2019 | Johnson ................. H04L 67/34 |

OTHER PUBLICATIONS

"Creating FQDN With Split DNS," the article is retrieved from https://www.3cx.com/docs/creating-fqdn-split-dns/.
"Configure Proxy WebRTC With CMS over Expressway with Dual Domain," the article is retrived from https://www.cisco.com/c/en/us/support/docs/unified-communications/expressway/211301-Configure-Proxy-WebRTC-With-CMS-over-Exp.html.

* cited by examiner

*Primary Examiner* — Alexander Lagor
*Assistant Examiner* — William B Jones
(74) *Attorney, Agent, or Firm* — Finnegan, Henderson, Farabow, Garrett & Dunner, LLP

(57) ABSTRACT

A method for establishing communication includes receiving a request to establish communication with a server, the request including an internet protocol address of the server, forming a unique domain name comprising a unique part and a general part, and associating the unique domain name with the internet protocol address. The method further includes storing the unique domain name in association with the internet protocol address on a domain name server, and establishing a communication between a user device and the server by resolving the unique domain name.

18 Claims, 7 Drawing Sheets

500

SYSTEMS AND METHODS FOR SUPPORTING A SECURE CONNECTIVITY

TECHNICAL FIELD

The present disclosure relates to systems and methods for establishing a communication between devices via a network, and more particularly, to systems and methods for selecting a domain name for a local server having an internet protocol (IP) address.

BACKGROUND

Browsers installed on computers and mobile devices provide real-time communications (RTC) and hypertext transfer protocol (HTTPS) communications via simple application program interfaces (APIs). For example, clients may use platforms such as WebRTC to design RTC applications for communication of various devices available to the clients. Such RTC applications need to connect to a local on-premise server deployed with a static or dynamic IP. Frequently, however, RTC or HTTPS applications (e.g., applications that are being run by web browsers) may include security measures that require browsers to check for a domain-validated certificate signed by a certificate authority (CA). Such a certificate may not be present for a local server, as the local server may not have a corresponding unique domain name registered with a CA. Therefore, RTC applications may not be able to communicate using the local server. To address the problem set forth above, the present disclosure describes systems and methods for providing a unique domain name for the local server without requiring the local server to register with a CA.

SUMMARY

Consistent with a disclosed embodiment, a method for establishing communication includes receiving a request to establish communication with a server, the request including an internet protocol address of the server, forming a unique domain name comprising a unique part and a general part, and associating the unique domain name with the internet protocol address. The method further includes storing the unique domain name in association with the internet protocol address on a domain name server, and establishing a communication between a user device and the server by resolving the unique domain name.

Consistent with another disclosed embodiment, a system for facilitating communications between devices includes a domain name server with an associated database, a server, and at least one processor for executing operations. The operations include receiving a request to establish communication with the server, the request including an internet protocol address of the server, forming a unique domain name comprising a unique part and a general part, and associating the unique domain name with the internet protocol address. The operations further include storing in the associated database the unique domain name in association with the internet protocol address on the domain name server, and establishing a communication between a user device and the server by resolving the unique domain name.

Consistent with another disclosed embodiment, a non-transitory computer readable medium includes instructions that, when executed by at least one processor, cause to perform operations. The operations include receiving a request to establish communication with a server, the request including an internet protocol address of the server, forming a unique domain name comprising a unique part and a general part, and associating the unique domain name with the internet protocol address. The operations further include storing the unique domain name in association with the internet protocol address on a domain name server, and establishing a communication between a user device and the server by resolving the unique domain name.

The foregoing general description and the following detailed description are exemplary and explanatory only and are not restrictive of the claims.

BRIEF DESCRIPTION OF THE DRAWINGS

The accompanying drawings are not necessarily to scale or exhaustive. Instead, the emphasis is generally placed upon illustrating the principles of the embodiments described herein. These drawings, which are incorporated in and constitute a part of this specification, illustrate several embodiments consistent with the disclosure, and, together with the detailed description, serve to explain the principles of the disclosure. In the drawings.

DETAILED DESCRIPTION

Reference will now be made in detail to example embodiments, discussed with regard to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus, the systems, methods, and examples are illustrative only and are not intended to be necessarily limiting.

The disclosed embodiments relate to systems and methods for facilitating RTC and/or HTTPS communications between applications (e.g., applications being run by browsers) installed on computers and mobile devices of a client. The RTC or HTTPS capabilities may be provided to the client (e.g., an organization that wants to establish RTC (HTTPS) capabilities within a local area network) by a provider (e.g., a company for providing the RTC (HTTPS)

capabilities). In some cases, the provider may provide to the client a local on-premise server which may be, for example, any suitable computing device having suitable software and hardware for managing communications between computers and mobile devices running an RTC (HTTPS) application. In various cases, RTC (HTTPS) applications installed on user devices may need to connect to the local server deployed with an IP address. However, RTC (HTTPS) applications may not be able to access local servers using the IP address. Browsers that use RTC (HTTPS) applications may include security measures that require browsers to check for a domain-validated certificate signed by a certificate authority (CA). The local server may not have the corresponding certificate as there is no unique domain name associated with the server. In one embodiment, the client may be required to register for a unique domain name that can be resolved by a domain name server of an internet service provider, and register the unique domain name corresponding to the local server with the CA. However, such operations may be burdensome to the client and further involve fees associated with registering the unique domain name. Thus, another approach may be used that involves providing to the client a unique domain name by the provider of an RTC or HTTPS application, as further explained below.

Figure 1:
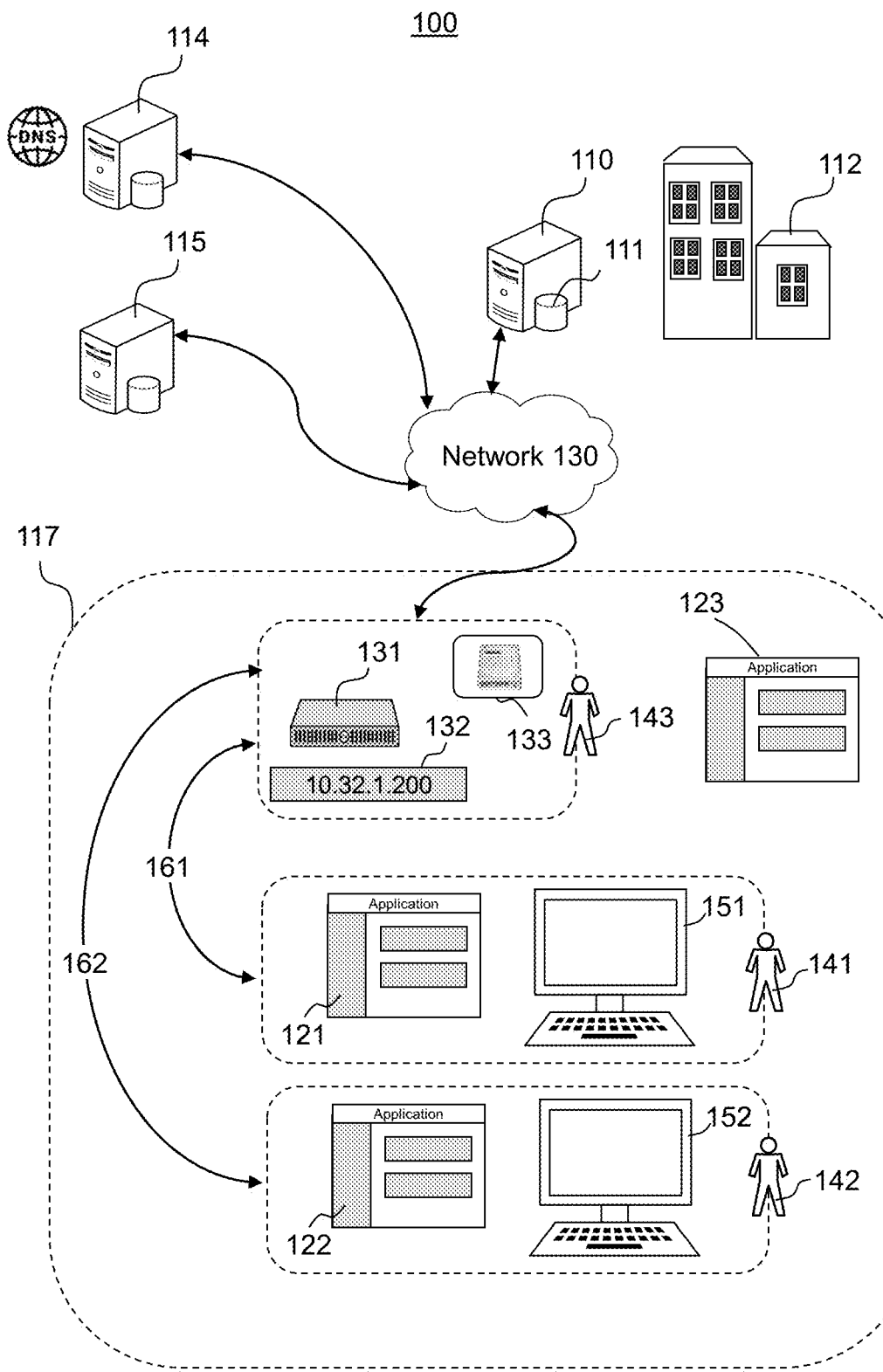
FIG. 1 is an example system for facilitating communications using RTC applications consistent with disclosed embodiments.

In various embodiments, consistent with the present disclosure, a provider 112 of an RTC or HTTPS application may include a server 110 as shown in FIG. 1. Server 110 may have an associated database 111. Provider 112 may provide various software applications to clients and may provide hardware for communications of various users of a client 117. In an example embodiment, provider 112 may provide a server 131 to client 117. In various embodiments, provider 112 may be configured to communicate with CA server 115 to obtain a certificate, as further described below.

As noted above, client 117 may be an organization that uses RTC (HTTPS) capabilities within its local area network. Client 117 may include a server 131 and user devices 151 and 152, operated by users 141 and 142. In various embodiments, users 141 and 142 may use applications 121 and 122, respectively, to communicate with one another. In an example embodiment, applications 121 and 122 may be browser-based applications. Applications 121 and 122 may be configured to communicate with each other via server 131. In an example embodiment, a websocket protocol may be used for full-duplex communication between a user device (e.g., device 151 supporting application 121) and server 131.

Applications 121 and 122 may support various forms of communication. For example, applications 121 and 122 may include a chat interface, a phone interface, a video communication interface, an interface for sharing a whiteboard, an interface for sharing an application, and the like. In various embodiments, server 131 may be maintained by an administrator 143 that may update server 131 via an application 123. In some cases, application 123 may be a browser-based application and may include multiple pages/forms/interfaces and the like.

Server 131 may be any suitable computing device for facilitating communication between devices 151 and 152. In an example embodiment, as shown in FIG. 1, server 131 may include a memory storage device 133, and may have an associated static or dynamic IP address (e.g., address 10.32.1.200, as shown in FIG. 1). Server 131 may include at least one processor that may execute various programming instructions for facilitating communication between user devices 151 and 152. In an example embodiment, devices 151 and 152 may be connected to server 131 using any suitable means (e.g., using a wireless or wired connection). For instance, devices 151 and 152 may communicate with each other via server 131 as indicated, for example, by arrows 161 and 162.

Server 131 may be configured to communicate via network 130 with server 110 of provider 112, and a domain name server (DNS) 114. For example, server 131 may communicate to server 110 information that can be used by server 110 to configure the domain name. Once the domain name is configured by server 110, server 131 may communicate with DNS server 114 to resolve the domain name selected for server 131 by provider 112.

Figure 2:
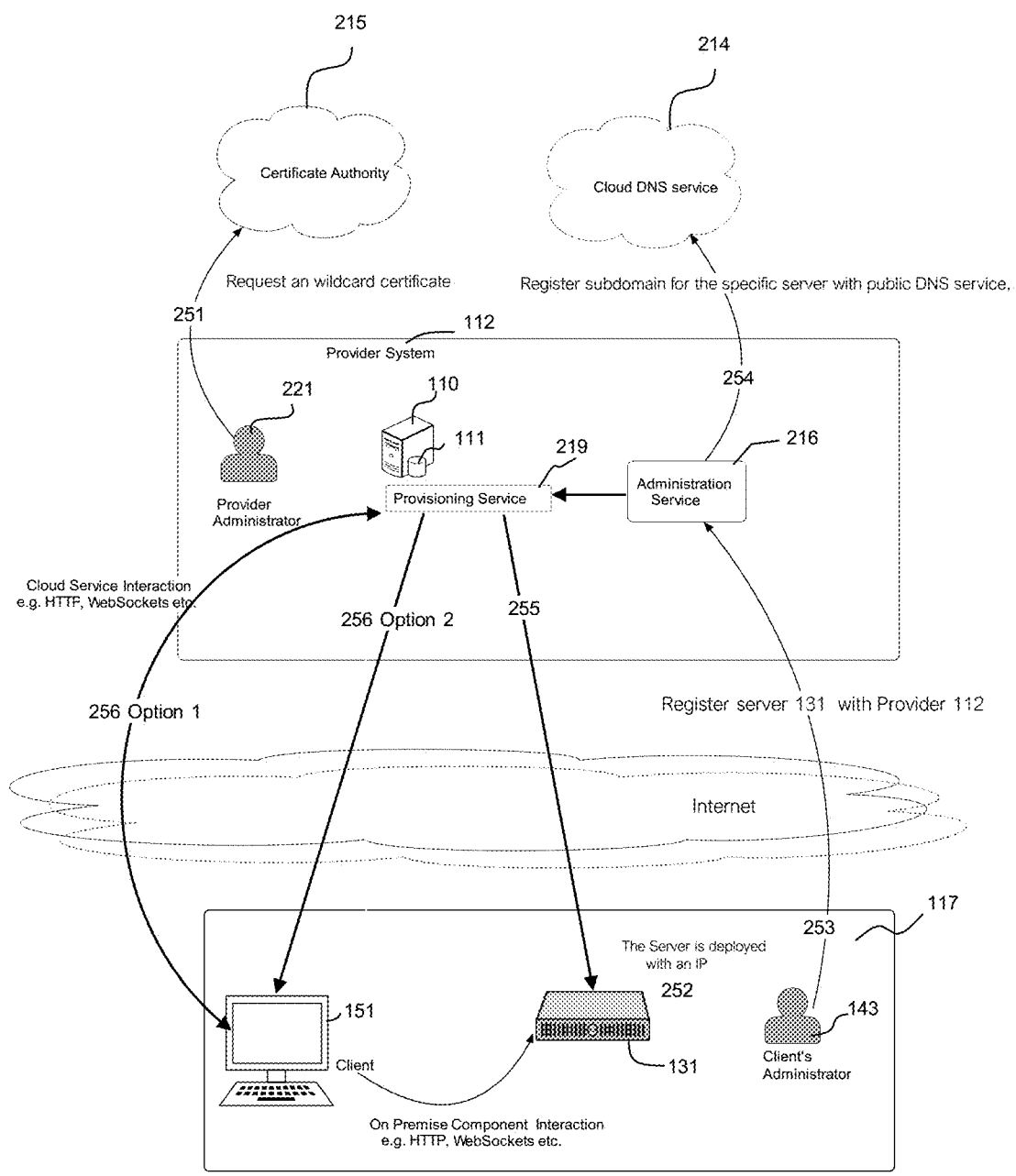
FIG. 2 is an example diagram of a process of provisioning client server and client devices with a domain name and a certificate consistent with disclosed embodiments.

FIG. 2 shows an example process 200 of configuring the domain name for server 131 consistent with disclosed embodiments. In various embodiments provider 112 may be configured to install, manage and provision components (e.g., server 131) for client 117. At step 251 of process 200, an administrator 221 of provider 112 may request a wildcard certificate from a certificate authority 215 for the wildcard domain-specific for on-premises servers. For example, a wildcard certificate may be "*.example.com" where "*" represents the wildcard. At step 252, provider 112 may provide client 117 with a local server (e.g., server 131) that may be deployed with a static or dynamic IP address. At step 253, client's administrator 143 may register the server via an account configuration web server (e.g., server 110). For example, administrator 143 may add an IP address of server 131 to an account configuration for client 117. As shown in FIG. 2, at step 253, administrator 143 may provide information about server 131 (e.g., an IP address of server 131) to an administration service 216. Administrator service 216 may be a software application used by provider administrator 221. Administration service 216 may record the information using a provisional service 219, which may be a software application associated with server 110 and database 111. At step 254, administration service 216 may register a unique domain name for server 131 with public DNS service. In an example embodiment, the domain name may be selected by the provider 112 to ensure that the domain name is unique. At step 255, provisional service 219, may provision server 131 using a provisioning procedure. The provisioning procedure may include propagating the wildcard certificate (obtained in step 251) to server 131, as well as propagating any other suitable configuration information for server 131 (e.g., propagating a domain name associated with server 131). In an example embodiment, server 131 may access provider 112 (e.g., may access server 110 of provider 112) and request the provisioning profile, which may include the server configuration details (e.g., a domain name associated with server 131) and the wildcard certificate. At step 256 option 1, provider 112 may include the unique domain name in commands (e.g., websocket requests) for client devices (e.g., device 151 as shown in FIG. 2) or at step 256 option 2, provider 112 may provide clients with the unique domain name, so that clients could access the domain name via a suitable application (e.g., a web browser).

Figure 3A:
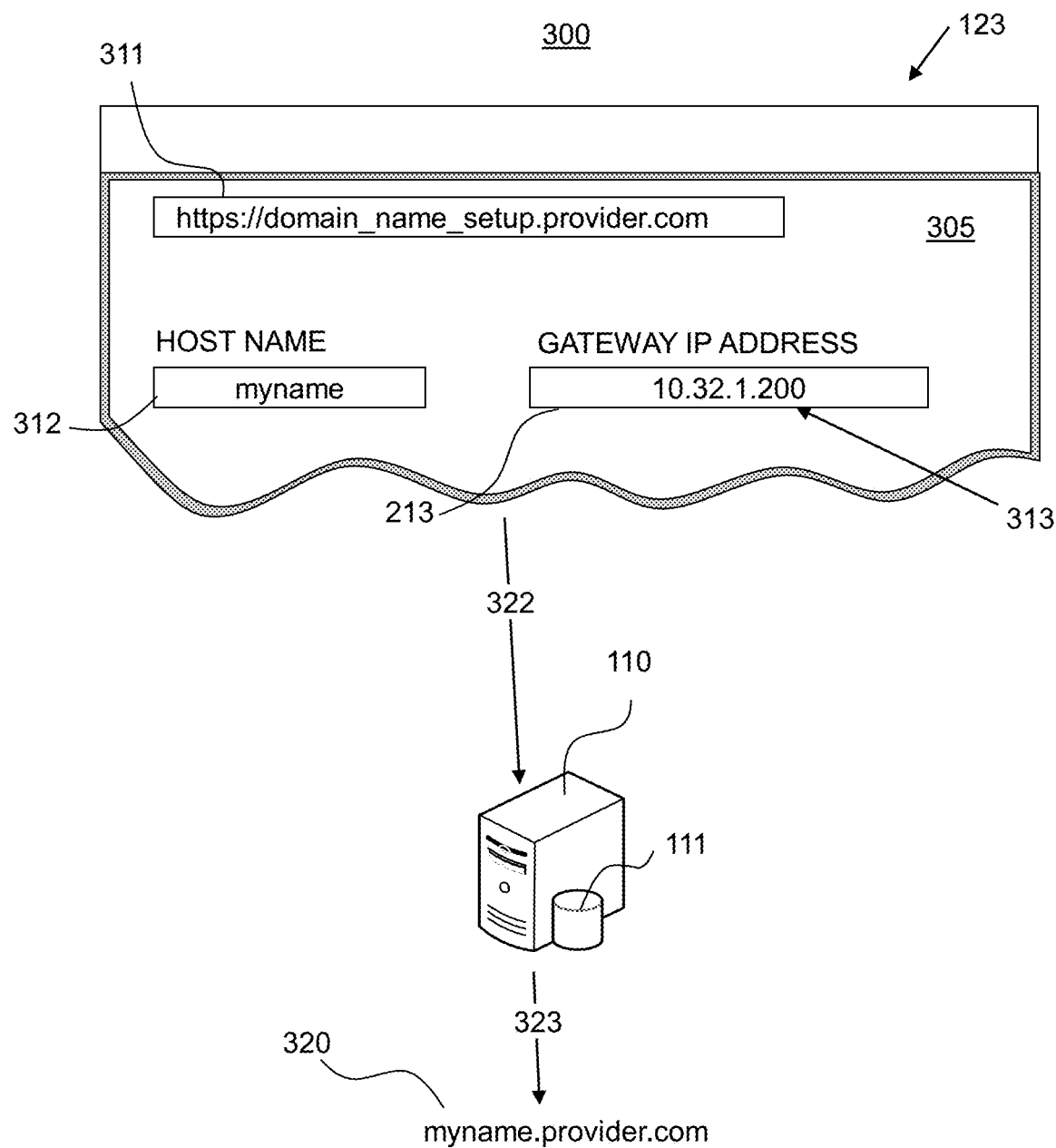
FIG. 3A is an example diagram for demonstrating a way to establish a correspondence between an internet protocol (IP) address of a local server and a unique domain name consistent with disclosed embodiments.

Further details of various steps of process 200 are shown in subsequent figures. For example, FIG. 3A shows a process 300 of configuring the domain name for server 131 as described by step 253 of process 200, as shown in FIG. 2. FIG. 3A shows application 123 having an interface 305 for communicating information about server 131 to server 110. In an example embodiment, application 123 may be a web browser operated by administrator 143, and interface 305 may be a webpage provided by server 110 of provider 112. For example, administrator 143 may enter a uniform resource locator (URL) 311 associated with the webpage (e.g., https://domain_name_setup.provider.com). Interface 305 may request administrator 143 to enter a desired unique name part 312 (also referred to as unique name 312) of the domain name (e.g., myname) via a field of interface 305. Alternatively, provider 112 may be configured to select unique name 312 to ensure that part 312 is unique. In some cases, provider 112 may be configured to receive desired unique part 312, determine if it is unique, and if unique name 312 was previously used, request administrator 143 to enter a different unique name. In some cases, provider 112 may suggest possible unique names 312 that can be selected by administrator 143. Further, interface 305 may require administrator 143 to enter an IP address 313 (e.g., 10.32.1.200) associated with server 131 in a field of interface 305. At step 322 of process 300, administrator 143 may submit the entered information for processing by server 110 of provider 112. At step 323, server 110 may form a unique domain name 320 for server 131 based on unique name 312 (e.g., "myname" as shown in FIG. 3A) entered in a field of interface 305. For example, server 110 may form unique domain name 320 "myname.providername.com" or any other suitable domain name (e.g., "myname.provider.com" as shown in FIG. 3A) that may include unique name 312 "myname" as a part of the domain name. In an example embodiment, unique name 312 "myname" may be a subdomain for domain "provider.com." Domain part "provider.com" is referred to as a general part of unique domain name 320.

Figure 3B:
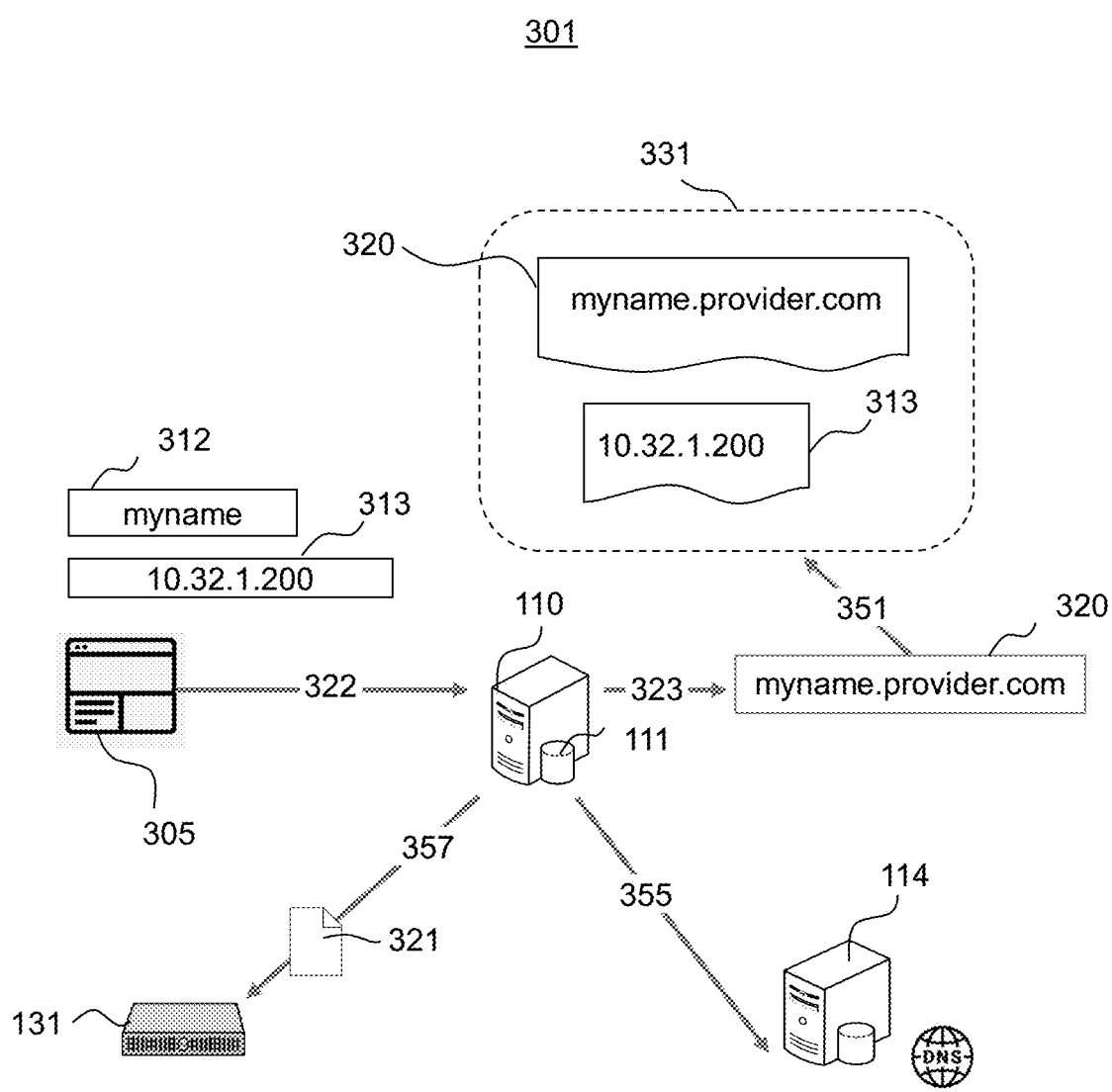
FIG. 3B is an example process for establishing a correspondence between an IP address of a local server and a unique domain name consistent with disclosed embodiments.
Figure 4:
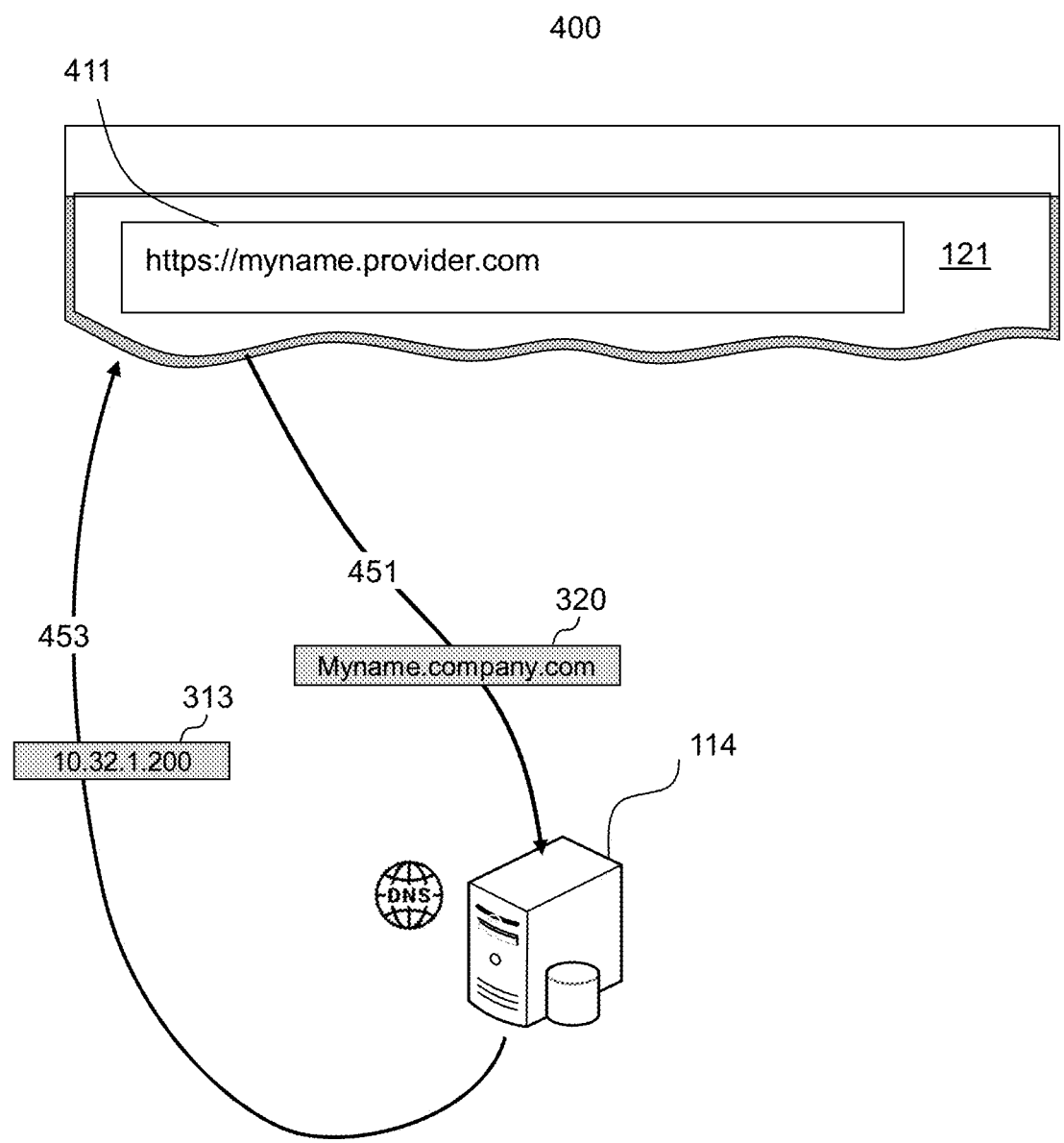
FIG. 4 is an example process of resolving a unique domain name consistent with disclosed embodiments.

FIG. 3B shows an example process 301 executed by server 110 for providing a unique domain name for server 131. Process 301 may follow steps 251, 254, and 256 of process 200. At step 322 (which may be the same as step 322 of FIG. 3A), server 110 may receive unique name 312 and IP address 313 using interface 305, and at step 323 (which may be the same as step 323 of process 300) form unique domain name 320. At step 351, server 110 may be configured to associate unique domain name 320 (e.g., "myname.provider.com") with IP address 313 and store an associated record 331 in database 111. Further, at step 355, server 110 may provide the record 331 to DNS server 114. DNS server 114 may register unique domain name 320 and be configured to resolve domain name 320, i.e., provide IP address 313 upon receiving domain name 320 as a part of a request from a browser as illustrated in FIG. 4. Turning to FIG. 4, upon receiving a request 411 for an IP address via application 121, DNS server 114 may receive domain name 320 at step 451 and at step 453 return IP address 313. Returning to FIG. 3B, at step 357, server 110 may be configured to transmit to server 131 a certificate 321 from a CA. Certificate 321 may be the wildcard certificate obtained at step 251 of process 200.

Figure 5A:
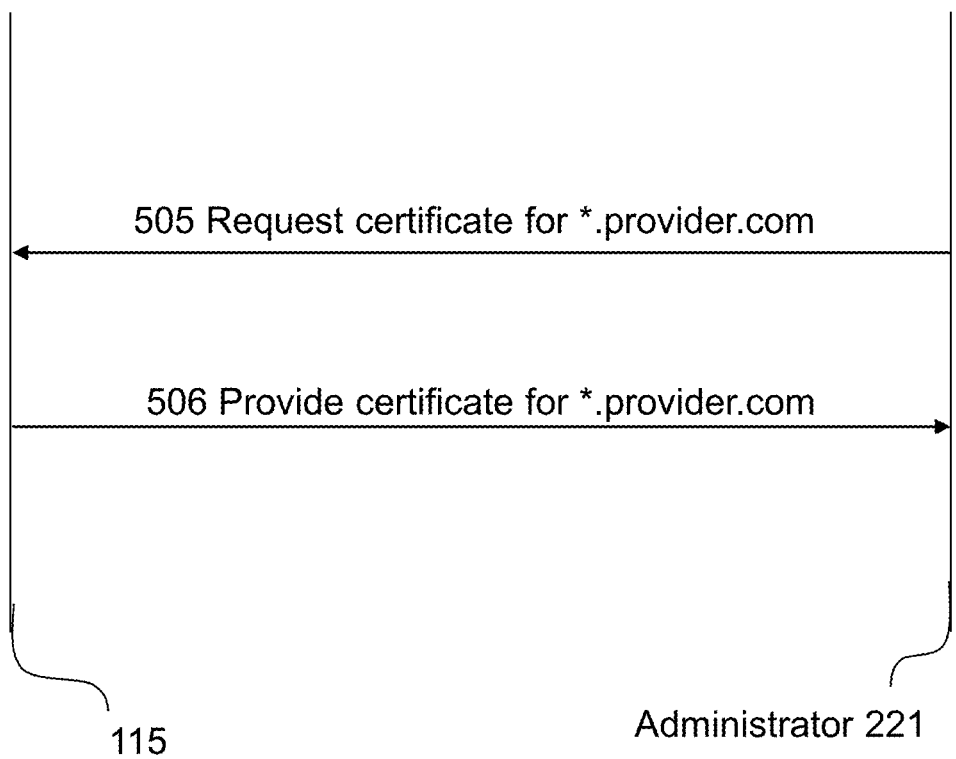
FIG. 5A is an example process of obtaining a domain certificate consistent with disclosed embodiments.

FIG. 5A shows an example process 500 of obtaining a certificate from a CA. Process 500 may be the same as step 251 of process 200. At step 505 of process 500, an administrator of provider 112 (e.g., administrator 221) may request a certificate (e.g., the wildcard certificate) from CA server 115. In an example embodiment, administrator 221 may request the wildcard certificate for all of the domain names that are in a form "*.provider.com" where "*" may be a placeholder for any unique name 312. For example, a certificate for "*.provider.com" may be a valid certification for unique domain name 320 "myname.provider.com." Upon receiving request for the wildcard certificate from administrator 221, and upon receiving an appropriate fee for the certificate, server 115 may provide certificate 321 to administrator 221 at step 506 (as shown in FIG. 5A).

Figure 5B:
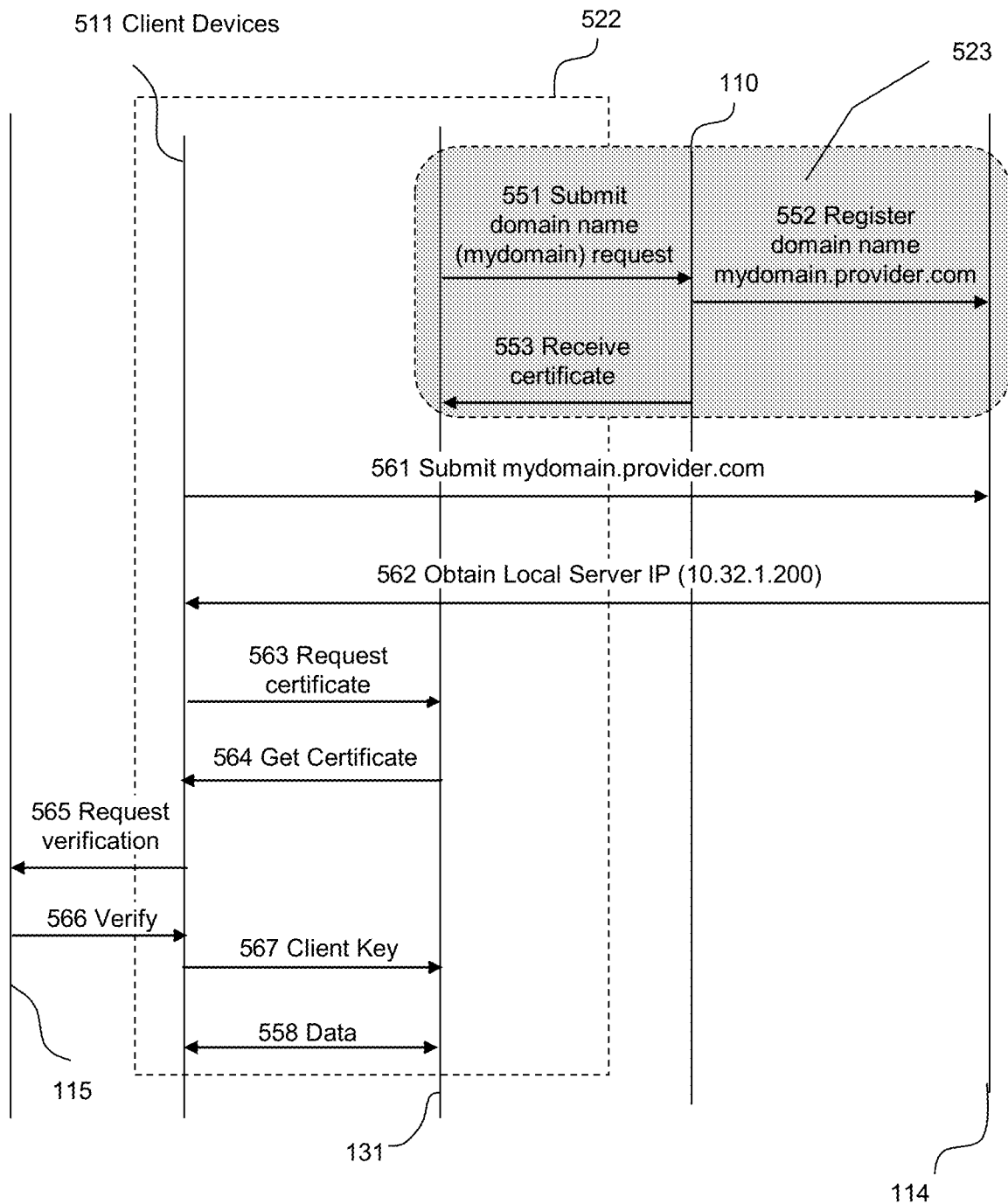
FIG. 5B is an example process of establishing communication between devices using a local server consistent with disclosed embodiments.

FIG. 5B shows an example process 501 of establishing communication between devices using local server 131 consistent with disclosed embodiments. FIG. 5B shows client 117 devices (e.g., devices 151 and 152, as shown in FIG. 1) communicating with server 131 within a local area network 522. In various embodiments, the local area network may be established to limit communications with an outside network, and in some cases, a local area network may be used if there is a limited connection with the outside network. For example, the local area network may support text audio and video communication of client devices without requiring operational phone lines. Process 501 may include a subprocess 523 indicated by steps within a grey area (as shown in FIG. 5B) for obtaining unique domain name 320 (as shown, for example, in FIG. 3A) and for obtaining certificate 321 (also shown in FIG. 3B). At step 551 of process 501, an administrator of server 131 (e.g., administrator 143, as shown in FIG. 1) may submit an IP address 313 to provider 112. In some cases, administrator 143 may attempt to select a unique name 312, and in other cases unique name 312 may be selected by provider 112. Step 551 may be the same as step 322 of process 300. At step 552, provider 112 may request DNS server 114 to register unique domain name 320. Step 552 may be the same as step 351 of process 300. At step 553, provider 112 may transmit to server 131 certificate 321. In various embodiments, certificate 321 may have been obtained from a CA as previously described by process 500. Step 553 completes a subprocess 523, and server 131 may be configured to facilitate communication of client devices 511.

Communication between client devices 511 may proceed according to steps 561-568 of process 501. As noted above, client devices 511 (e.g., devices 151 and 152) may communicate using any suitable applications 121 and 122 (shown in FIG. 1). For example, applications 121 and 122 may include a communication interface provided via a web browser, standalone application, mobile phone application, and the like. At step 561 of process 501, a client application (e.g., application 121) enters domain name 320 "myname.provider.com" and submits domain name 320 to DNS server 114. DNS server 114 resolves domain name at step 562 (e.g., DNS server 114 provides IP address 313 for domain name 320 as described, for example by process 400 of FIG. 4. Step 561 of process 501 may correspond to step 451 of process 400, and step 562 of process 501 may correspond to step 453 of process 400). At step 563 of process 501, application 121 may request certificate 321 (as shown in FIG. 3) from server 131 for authenticating server 131. At step 564, server 131 may return certificate 321, and at step 565, application 121 may request verification from a CA. At step 566, a CA may verify certificate 321 by providing to application 121 a verification key. In various embodiments, steps 565 and 566 may be done prior to steps 563 and 564. Upon verification of server 131 using certificate 321, at step 567, application 121 and server 131 may exchange public keys for encrypting data, and at step 568 application 121 may proceed in exchanging secure communication (encoded with public keys of application 121 and server 131).

As noted above, server 131 may be configured to support communication of devices 151 and 152 via a local area network. Further, as explained above, in an example embodiment, various client applications (e.g., application 121) are configured to contact DNS server 114 to resolve unique domain name 320. In an example embodiment, DNS server 114 may be, for example, Amazon Router 53, and the like. Alternatively, to ensure that no external communication is performed by server 131 (i.e., all the communications characterized by steps 561-564 and steps 567-568 of process 501 are contained within a local area network), DNS server 114 may be a local DNS server. In an example embodiment, steps 565 and 566 may not require applications 121 and 122 to contact a CA for verification of certificate 321. In an example embodiment, applications 121 and 122 may receive a key for decrypting certificate 321 and for verifying that a unique domain name obtained from decrypting certificate 321 matches unique domain name 320 provided to server 131. The key may be provided by a CA only once prior to any communication over a local area network. Thus, once the key has been distributed to various devices of client 117, all the subsequent communications may be done over the local area network. Alternatively, if DNS server 114 is external to the local area network, server 131 may be configured to block all inbound and outbound communications with devices outside a local area network, apart from communications with DNS 114.

As described above, the local area network may include various devices (e.g., server 131 and user devices 151 and 152, as shown in FIG. 1) for communicating text, audio, and video data. Devices 151 and 152 may include one or more computing devices configured to perform one or more operations consistent with disclosed embodiments. For example, user devices (e.g., device 151) may include a desktop computer, a laptop, a server, a mobile device (e.g., tablet, smartphone, etc.), a set-top box, a gaming device, a wearable computing device, or another type of computing device. User devices 151 and 152 may include one or more processors configured to execute software instructions stored in memory, such as memory included in user devices 151 and 152 to perform operations to implement the functions related to requesting content, receiving the content and transmitting the content. A user device (e.g., device 151) may be configured for wired and/or wireless communications and may include software that, when executed by a processor, performs internet-related communication (e.g., TCP/IP) and content display processes. For instance, user device 151 may execute browser software that generates and displays interfaces including content on a display device included in, or connected to, user device 151. User device 151 may execute one or more applications that allow user devices 151 to communicate with other devices (e.g., device 152) via server 131, and display content in interfaces via display devices included in user device 151. For example, user device 151 may include a chat window, a phone dialup interface, a video communication interface for facilitating communication with device 152 via server 131.

The disclosed embodiments are not limited to any particular configuration of user device 151. For instance, user device 151 may be a mobile device that stores and executes an application to perform operations for exchanging any suitable content with user device 152. In certain embodiments, user device 151 may be configured to execute software instructions relating to location services, such as GPS locations. For example, user devices 151 may be configured to determine a geographic location (or location within an office of client 117) and provide location data and time stamp data corresponding to the location data to server 131 and/or device 152 with which device 151 is communicating.

As described above, in order to establish communication for devices 151 and 152, servers 110, 114, 115, and 131 may be used. Servers 110-131 may include associated databases (e.g., server 110 may include database 111) for storing any relevant information for facilitating communication of devices 151 and 152. Further, servers 110-131 include processors needed to perform operations of process 501. In some embodiments, servers 110-131 may include multiple core processors to handle concurrently multiple operations and/or streams. For example, server 131 may include parallel processing units to concurrently handle requests of multiple user devices (e.g., devices 151 and 152).

Database 111 may include one or more computing devices configured with appropriate software to perform operations for providing content to server 110. Database 111 may include, for example, Oracle™ database, Sybase™ database, or other relational databases or non-relational databases, such as Hadoop™ sequence files, HBase™, or Cassandra™. In an illustrative embodiment, database 111 may include computing components (e.g., database management system, database server, etc.) configured to receive and process requests for data stored in memory devices of the database and to provide data from the database.

Network system 130 may include any type of connections between various computing components. For example, network system 130 may facilitate the exchange of information via network connections that may include one or more local area networks (LANs), wide area networks (WANs), metropolitan area networks (MANs), or global interconnected internetworks, such as the public Internet, near field communication (NFC), or other suitable connection(s) that enable the sending and receiving of information between servers 110-131. In some embodiments, one or more servers 110-131 may communicate directly through a dedicated communication link(s).

As described above, server 131 may transmit/receive content to/from user device 151. Server 131 may store content in local memories (e.g., memory 133), that may be a caching infrastructures associated with server 131, local proxies, and/or the HTTPS caching capability. In some embodiments, server 131 may perform functions such as routing content, handling content requests, and creating sessions with user devices 151 and 152 for exchanging various content between devices 151 and 152. In some cases, other servers besides 131 may be available on the local area network for facilitating communication of various devices of client 117. In various cases, server 131 may also be configured to obtain information from a user device (e.g., device 151), manipulate the information (e.g., plot a graph corresponding to a table data provided by device 151), and deliver it to another user devices (e.g., device 152). As noted before, server 131 may be configured to handle multiple streams in parallel, such as providing different data streams to multiple user devices of client 117. Further, server 131 may be configured to provide authentication credentials to user devices of client 117. For example, server 131 may provide a secure cookie, or an equivalent technique for authentication, at a session startup time.

In some embodiments, server 131 may take a form of a general-purpose computer, a mainframe computer, or any combination of these components. In other embodiments, server 131 may be a virtual machine. As noted above, server 131 may be configured to communicate with user devices via a local area network. For example, server 131 may be configured to block all inbound and outbound communications with devices outside a local area network, apart from communications with DNS server 114 when DNS server 114 is outside of the local area network.

As noted above, server 131 may include one or more storage devices (e.g., device 133) configured to store instructions used by processors of server 131 to perform functions related to the disclosed embodiments. For example, memory storage devices may store software instructions.

In some embodiments, processors of server 131 may include one or more known processing devices, such as, but not limited to, microprocessors from the Pentium™ or Xeon™ family manufactured by Intel™, the Turion™ family manufactured by AMD™, or any of various processors from other manufacturers. However, in other embodiments, the processors may be a plurality of devices coupled and configured to perform functions consistent with the disclosure. For example, the processors may include a plurality of co-processors, each configured to run specific edge computing system 131 operations such as floating-point arithmetic, graphics, signal processing, string processing, cryptography or I/O interfacing. In some embodiments, processors may include a field-programmable gate array (FPGA), central processing units (CPUs), graphical processing units (GPUs), and the like.

It is to be understood that the configuration and the functionality of components of user devices 151 and 152 or servers 110-131 have been defined herein for the convenience of the description. Alternative configurations can be defined as long as the specified functions and relationships thereof are appropriately performed. Alternatives (including equivalents, extensions, variations, deviations, etc., of those described herein) will be apparent. Such alternatives fall within the scope and spirit of the disclosed embodiments.

The foregoing description has been presented for purposes of illustration. It is not exhaustive and is not limited to precise forms or embodiments disclosed. Modifications and adaptations of the embodiments will be apparent from a consideration of the specification and practice of the disclosed embodiments. For example, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application; such examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents which may be resorted to fall within the scope of the disclosure.

Other embodiments will be apparent from a consideration of the specification and practice of the embodiments disclosed herein. It is intended that the specification and examples be considered as an example only, with a true scope and spirit of the disclosed embodiments being indicated by the following claims.

What is claimed is:

1. A method for establishing communication in a network supporting a plurality of user devices and servers, the method comprising:
   receiving, by a second server via an interface, a request to register a first server, the request including a unique name of the first server and an internet protocol address of the first server;
   forming, by the second server, a unique domain name for the first server based on the unique name of the first server;
   associating, by the second server, the unique domain name with the internet protocol address;
   providing, by the second server, the unique domain name to the first server; and
   providing, by the second server, the unique domain name in association with the internet protocol address to a domain name server.

2. The method of claim 1, wherein the unique domain name comprises the unique name of the first server and a general part, the unique name corresponds to a subdomain part of the unique domain name, and the general part corresponds to a domain part of the unique domain name.

3. The method of claim 2, further comprising obtaining, by the second server, a certificate from a certification authority, wherein the certificate is obtained for any unique domain name that includes the general part.

4. The method of claim 3, further comprising providing, by the second server, the certificate to the first server.

5. The method of claim 1, wherein the first server is communicating with the user device over a local area network.

6. The method of claim 1, wherein the communication between the user device and the first server is facilitated by web browsers.

7. The method of claim 1, wherein a websocket protocol is used for full-duplex communication between the user device and the first server.

8. The method of claim 1, wherein the first server blocks all inbound and outbound communications with devices outside a local area network, apart from communications with the domain name server.

9. The method of claim 1, wherein the request is received by a third party.

10. A system for facilitating communications between a client device and a first server, comprising:
    a second server communicatively connected with the first server and a domain name server,
    wherein the second server includes at least one processor for executing operations comprising:
    receiving, via an interface, a request to register the first server, the request including a unique name of the first server and an internet protocol address of the first server;
    forming a unique domain name for the first server based on the unique name of the first server;
    associating the unique domain name with the internet protocol address;
    providing the unique domain name to the first server; and
    providing the unique domain name in association with the internet protocol address to the domain name server.

11. The system of claim 10, wherein the unique domain name comprises the unique name of the first server and a general part, the unique name corresponds to a subdomain part of the unique domain name, and the general part corresponds to a domain part of the unique domain name.

12. The system of claim 11, wherein the at least one processor further executes operations comprising obtaining a certificate from a certification authority, wherein the certificate is obtained for any unique domain name that includes the general part.

13. The system of claim 12, wherein the at least one processor further executes operations comprising providing the certificate to the server.

14. A non-transitory computer readable medium including instructions that, when executed by at least one processor of a second server, cause the at least one processor to perform operations comprising:
   receiving, via an interface, a request to register a first server, the request including a unique name of the first server and an internet protocol address of the first server;
   forming a unique domain name for the first server based on the unique name of the first server;
   associating the unique domain name with the internet protocol address;
   providing the unique domain name to the first server; and
   providing the unique domain name in association with the internet protocol address to a domain name server.

15. The non-transitory computer readable medium of claim 14, wherein the unique domain name comprises the unique name of the first server and a general part, the unique name corresponds to a subdomain part of the unique domain name, and the general part corresponds to a domain part of the unique domain name.

16. The non-transitory computer readable medium of claim 15, wherein the operations further comprising obtaining a certificate from a certification authority, wherein the certificate is obtained for any unique domain name that includes the general part.

17. The non-transitory computer readable medium of claim 16, wherein the operations further comprising providing the certificate to the first server.

18. The non-transitory computer readable medium of claim 14, wherein the first server blocks all inbound and outbound communications with devices outside a local area network, apart from communications with the domain name server.

* * * * *